Dec. 20, 1927.
C. KACHEL
VEHICLE BRAKE
Filed June 17, 1926
1,653,013
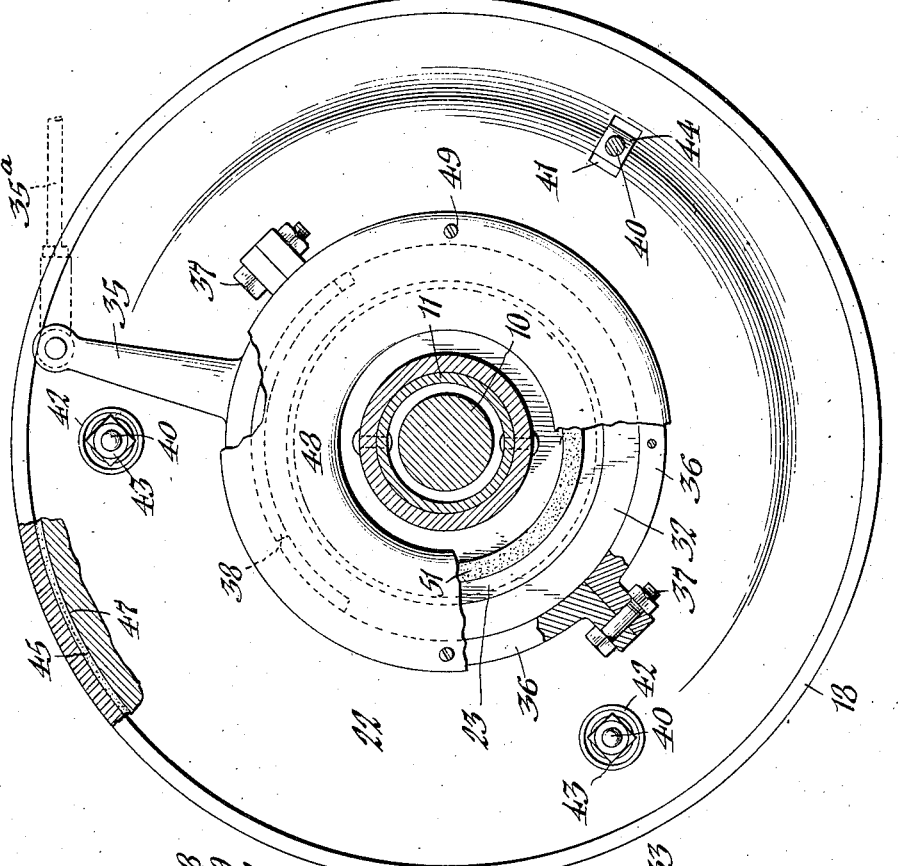
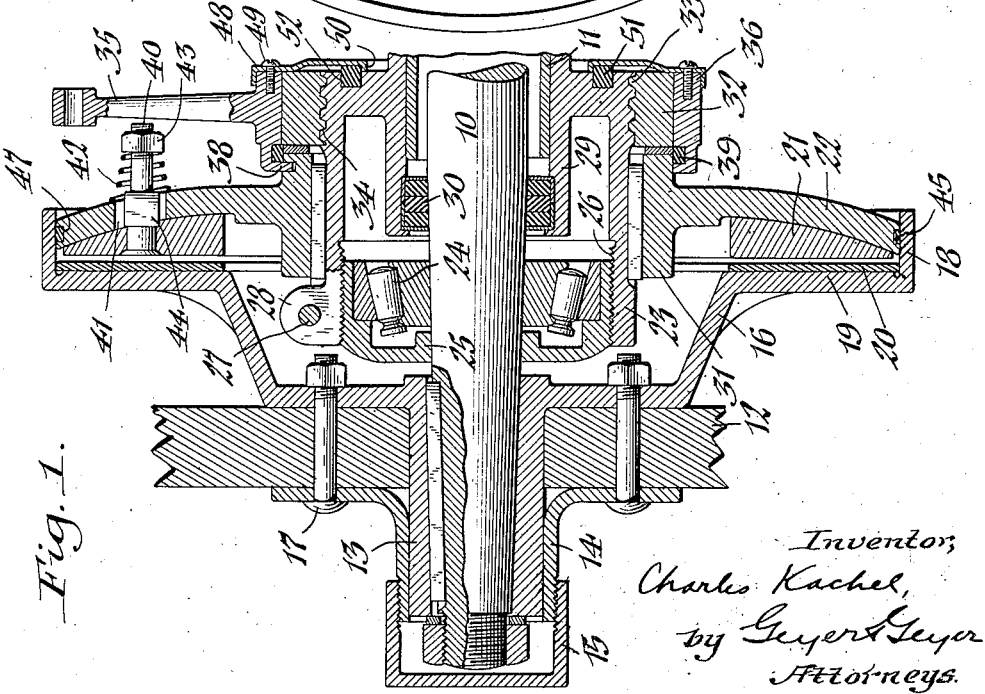
Inventor,
Charles Kachel,
by Geyer & Geyer
Attorneys.

Patented Dec. 20, 1927.

1,653,013

UNITED STATES PATENT OFFICE.

CHARLES KACHEL, OF MIAMI, FLORIDA.

VEHICLE BRAKE.

Application filed June 17, 1926. Serial No. 116,579.

This invention relates to improvements in the brakes of automobiles and other vehicles.

One of its objects is the provision of an efficient, reliable, and effective braking mechanism which is constructed for attachment to the rear axles of motor vehicles.

Another object of the invention is to provide a friction type brake which is simple and compact in construction, which is not liable to get out of order, and which can be manufactured at a moderate cost.

In the accompanying drawings: Figure 1 is a vertical transverse section of a vehicle brake embodying my invention. Figure 2 is an inside face view thereof, partly in section.

Similar characters of reference indicate corresponding parts throughout the several views.

This improved brake mechanism has been designed more particularly for use in connection with the wheels of automobiles, and referring now to the drawings, 10 indicates the vehicle-axle, 11 the axle-housing and 12 the vehicle-wheel having its hub 13 keyed or otherwise fixed on the end of the axle. Applied to the front side of the wheel about its hub is a hub-plate 14 having a cap 15 screwed thereon.

Projecting from the rear end of the metallic wheel-hub 13 and formed integrally therewith is a brake-member or drum 16 fastened to the spokes of the wheel by bolts 17 or similar fastenings and having an inwardly-facing annular flange or rim 18 thereon. In its side wall, adjacent this rim, the brake drum is formed with an annular braking portion or surface 19 containing a brake lining or disk 20 of a woven asbestos fabric or similar material.

Cooperating with the braking surface of the drum 16 and controlled from the operator's station of the vehicle is a companion non-rotatable braking member preferably in the form of a metallic ring 21 applied to a carrying member or disk 22 splined on a sleeve 23 riveted or otherwise fixed to the axle-housing 11. The enlarged front end of this sleeve extends into the hollow portion of the drum, as shown in Fig. 1, and interposed between said sleeve and the axle 10 is a roller bearing 24 held in place by a retaining nut 25 engaging the threaded bore 26 of the sleeve. This bearing is held in its adjusted position by a clamping bolt 27 passing through ears 28 formed on the sleeve 23. The latter is preferably provided on its interior and in rear of the bearing 24 with a collar 29 between which and the axle a suitable packing 30 is interposed for preventing leakage of lubricant from the axle-housing into the interior of the sleeve.

The means for sliding the brake-carrying disk 22 lengthwise of the sleeve to bring its braking-ring 21 into and out of frictional contact with the drum-lining 20 consists of an actuating device applied to the sleeve 23 in rear of the disk-hub 31 and capable of a combined rotary and longitudinal movement relative to said sleeve. This device preferably comprises a nut 32 having spiral teeth or cam ribs 33 in its bore meshing with corresponding teeth or cam-grooves 34 formed on the sleeve. An actuating lever 35 is connected to this nut, and as shown in Fig. 2, may be formed integral with one of the parts of a sectional collar 36 surrounding the nut and clamped thereon by bolts 37. The front face of the nut 32 abuts against the opposing end of the disk-hub 31 to compel the braking disk to move outwardly to its brake-applying position, when the nut is turned in a forward direction, its actuating lever 35 being connected by a suitable link 35ᵃ with the usual brake-pedal or lever, not shown. In order to compel the braking-disk to be positively withdrawn from engagement with the brake drum when the brake-pedal is released, the actuating lever is coupled with said disk. As shown in Figs. 1 and 2, the collar 36 of this lever has a segmental rib or flange 38 projecting from the front side thereof which engages a corresponding circular groove in the hub 31 of the disk. A packing 39 surrounds the disk-hub and is confined in the space between the coupling rib 38 and the opposing face of the lever-carrying collar. By this construction and arrangement of parts, as the brake pedal is moved to its applied and released positions, the lever-actuated nut 32 is turned or oscillated in a corresponding direction to positively shift the braking disk 22 into and out of engagement with the brake drum.

The metallic braking ring 21 carried by the disk 22 is preferably attached flexibly thereto by an annular row of bolts 40, three being shown in the drawings, fastened in the ring and extending rearwardly through radial slots 41 in the disk, as shown in Fig.

1. Coil springs 42 are interposed between the nuts 43 of the bolts and the rear face of the disk, said springs tending to hold the braking-ring against the concave front face of the disk, the rear face of the ring being convex to conform to the curvature of the disk. Those portions 44 of the bolts engaging the corresponding disk-slots 41 are substantially square in cross-section to prevent their turning in the slots.

To prevent the entrance of water, dirt and other foreign matter into the interior of the brake drum 16, an annular packing 45 is interposed between the drum-flange 18 and the periphery of the disk 22, such packing being seated in a groove 47 formed in said disk.

An annular cover plate 48 of spring steel or like material extends over the rear end of the joint between the sleeve 23 and nut 32, the same being fastened to the sectional collar 36 by screws 49. The inner margin of this cover plate terminates in an outwardly-facing flange 50 which partially embraces a packing ring 51 seated in a groove 52 in the rear face of the sleeve. By reason of the fact that this plate is of spring steel and yieldable, it holds the packing ring in place and in no way interferes with the relative movements of the parts 23 and 32 when applying and releasing the brake.

This improved braking mechanism is manifestly simple and compact in construction, it is reliable and positive in operation, and its parts are so constructed and organized that it is not liable to get out of order.

I claim as my invention:—

1. In an automobile brake, a wheel-hub carrying a brake-drum, an axle-housing, a member mounted on said housing and shiftable relatively to the brake-drum, a collar rotatable on the housing, a screw-threaded connection between said collar and the housing, means for connecting said shiftable member to said collar comprising a lip carried by one of said last-named elements and engaging a groove in the other, and means for actuating said collar.

2. In an automobile brake, a wheel-hub carrying a brake drum, an axle-housing, a member mounted on said housing and shiftable relatively to the brake-drum, a collar rotatable on the housing, a screw-threaded connection between said collar and the housing, means for connecting said shiftable member to said collar, and a clamping-band applied to said collar and carrying an actuating lever, said shiftable member having a recess and said band having a lip engaging the recess.

3. In an automobile brake, a wheel-hub carrying a brake drum, an axle-housing, a member mounted on said housing and shiftable relatively to the brake-drum, a laterally-movable collar rotatable on the housing and coupled to said shiftable member, means for actuating said collar, a dust-cover applied to the side of said collar and the adjacent part of the axle-housing and a packing ring interposed between said cover and said housing-part.

4. In an automobile brake, a wheel-hub carrying a brake-drum, an axle-housing, a disk shiftable on said housing and provided at its periphery with a packing ring bearing against the brake-drum, and a brake-ring mounted on said disk.

5. In an automobile brake, a wheel-hub carrying a brake-drum, an axle-housing, a sleeve fixed on the axle-housing adjacent to said drum, a non-rotatable disk carrying a brake-ring mounted on the front end of said sleeve and shiftable relatively to the brake-drum, a brake-lining on the inner face of said drum with which said brake-ring is adapted to engage, a combined rotary and longitudinally movable actuating member for said ring-carrying disk mounted on the rear end of said sleeve, and means for coupling said disk with said actuating member to move therewith in both directions.

CHARLES KACHEL.